United States Patent
Takahashi

(10) Patent No.: US 6,893,702 B2
(45) Date of Patent: May 17, 2005

(54) MAGNETIC RECORDING MEDIUM SUBSTRATE, METHOD OF PRODUCING THE SAME, AND METHOD OF EVALUATING MAGNETIC RECORDING MEDIUM

(75) Inventor: Shinichi Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/760,919

(22) Filed: Jan. 20, 2004

(65) Prior Publication Data

US 2004/0146749 A1 Jul. 29, 2004

Related U.S. Application Data

(62) Division of application No. 09/766,028, filed on Jan. 19, 2001, now Pat. No. 6,706,238.

(30) Foreign Application Priority Data

May 29, 2000 (JP) .................................. 2000-159101

(51) Int. Cl.[7] ............................. B32B 3/02; B32B 3/26; B22F 1/02
(52) U.S. Cl. .................. 428/65.3; 428/687; 428/312.8; 428/694 SG; 419/37
(58) Field of Search ................................ 428/612, 613, 428/687, 312.2, 312.8, 313.9, 315.5, 315.7, 65.3, 65.4, 694 MP, 694 TS, 694 ST, 694 SG; 29/603.08, 603.13; 164/97; 75/348; 419/2, 37

(56) References Cited

U.S. PATENT DOCUMENTS

| | | | |
|---|---|---|---|
| 4,678,633 A | | 7/1987 | Osaki et al. |
| 4,690,846 A | | 9/1987 | Wada et al. |
| 4,738,885 A | | 4/1988 | Matsumoto |
| 4,758,272 A | | 7/1988 | Pierotti et al. |
| 4,940,596 A | | 7/1990 | Wright |
| 4,941,918 A | | 7/1990 | Horikoshi et al. |
| 5,093,173 A | | 3/1992 | Nakagawa et al. |
| 5,108,812 A | * | 4/1992 | Takahashi et al. .......... 428/141 |
| 5,166,006 A | * | 11/1992 | Lal et al. .................. 428/612 |
| 5,209,837 A | * | 5/1993 | Tsuya et al. .......... 428/694 SG |
| 5,478,657 A | * | 12/1995 | Suenaga et al. ............ 428/612 |
| 5,496,606 A | * | 3/1996 | Mizukami .................. 428/65.3 |
| 5,540,884 A | | 7/1996 | Chiao |
| 6,113,730 A | * | 9/2000 | Ohya et al. .............. 428/312.2 |
| 6,250,364 B1 | * | 6/2001 | Chung et al. ................. 164/97 |

FOREIGN PATENT DOCUMENTS

JP 09326115 12/1997

OTHER PUBLICATIONS

Translation JA 09–326115.*

* cited by examiner

Primary Examiner—Stevan A. Resan
Assistant Examiner—Louis Falasco
(74) Attorney, Agent, or Firm—Greer, Burns & Crain, Ltd.

(57) ABSTRACT

The present invention relates to a substrate for a magnetic recording medium that ensures a floating height on a magnetic head. This substrate is made of a sintered body provided with pores having a diameter in the range of 0.05 μm to 2.0 μm extending across 5% to 50% of the surface area of the substrate.

5 Claims, 10 Drawing Sheets

FIG.6

|  | Wp nm | MWp nm | Rp nm | Ra nm | RCmax nm |
|---|---|---|---|---|---|
| SUBSTRATE A | 2.0 | 3.0 | 5.2 | 0.75 | 8 |
| SUBSTRATE B | 1.5 | 1.8 | 5.0 | 0.73 | 11 |
| SUBSTRATE C | 2.0 | 2.9 | 4.8 | 0.68 | 22 |
| SUBSTRATE D | 2.0 | 3.0 | 2.0 | 0.18 | 15 |
| SUBSTRATE E | 3.4 | 4.2 | 5.5 | 0.83 | 25 |

FIG.7

| | SUBSTRATE | TEXTURE CONDITIONS ABRASIVE GRAIN PRIMARY AVERAGE SIZE (μm) | Wp (nm) | MWp (nm) | Rp (nm) | Wp+MWp +Rp (nm) | RCmax (nm) | GLIDE HEIGHT R=30mm (nm) | GLIDE HEIGHT R=45.8mm (nm) |
|---|---|---|---|---|---|---|---|---|---|
| EXAMPLE 1-1 | A | 0.15 | 2.0 | 3.2 | 3.0 | 8.2 | 8 | 7.7 | 8.9 |
| EXAMPLE 1-2 | B | 0.15 | 1.5 | 2.0 | 2.8 | 6.3 | 11 | 6.4 | 8.1 |
| EXAMPLE 1-3 | A | 0.3 | 2.0 | 3.2 | 3.8 | 9.0 | 8 | 8.3 | 9.5 |
| EXAMPLE 1-4 | B | 0.3 | 1.5 | 2.0 | 3.6 | 7.1 | 11 | 7.0 | 8.6 |
| COMPARATIVE EXAMPLE 1-1 | C | 0.3 | 2 | 3.2 | 3.7 | 8.9 | 22 | 8.2 | 11.5 |
| COMPARATIVE EXAMPLE 1-2 | E | 0.3 | 3.4 | 4.2 | 4.0 | 11.6 | 25 | 12.3 | 16.1 |

FIG.8

| | SUBSTRATE | TEXTURE CONDITIONS ABRASIVE GRAIN PRIMARY AVERAGE SIZE (μm) | Wp (nm) | MWp (nm) | Rp (nm) | Ra (nm) | Wp+MWp +Rp (nm) | GLIDE HEIGHT R=30mm (nm) | INITIAL FRICTION COEFFICIENT |
|---|---|---|---|---|---|---|---|---|---|
| EXAMPLE 2 | D | 0.15 | 2.0 | 3.2 | 2.6 | 0.25 | 7.8 | 7.5 | 2.0 |
| COMPARATIVE EXAMPLE 2 | D | NON-TEXTURE | 2.0 | 3.2 | 1.8 | 0.18 | 7.0 | 6.9 | 7.5 |

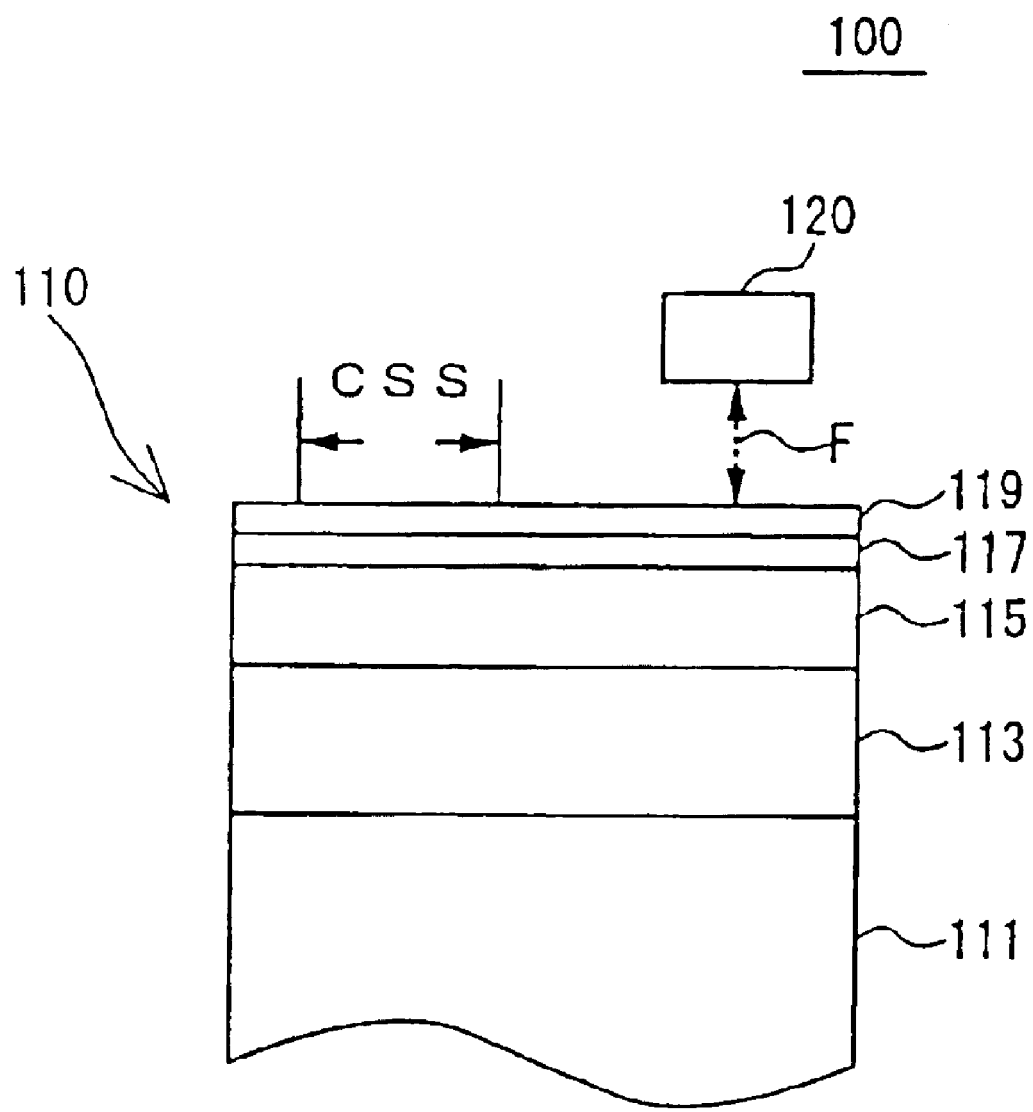

MAGNETIC RECORDING MEDIUM SUBSTRATE, METHOD OF PRODUCING THE SAME, AND METHOD OF EVALUATING MAGNETIC RECORDING MEDIUM

This is a divisional of application Ser. No. 09/766,028, filed Jan. 19, 2001, now U.S. Pat. No. 6,706,238.

BACKGROUND OF THE INVENTION

1. Field of the Invention

The present invention generally relates to magnetic recording media used in magnetic recording and reproducing apparatuses, and, more particularly, to a substrate for a magnetic recording medium that can reduce the floating height of the magnetic head in compliance with higher recording densities. The present invention also relates to a method of evaluating a magnetic recording medium that can reduce the floating height of the magnetic head.

2. Description of the Related Art

For a magnetic recording medium, such as a magnetic disk, the substrate is produced by providing nickel-phosphorus plating on the surface of an aluminum alloy, for instance, and polishing the resultant. On the surface of the substrate, irregularities are formed by a texture process. The reason why those irregularities are positively formed on the surface of a magnetic recording medium is that the magnetic head can magnetically record and reproduce information on the magnetic recording medium while maintaining a very small floating height from the magnetic recording medium. In this manner, the magnetic head can be prevented from adhering to the surface of the magnetic recording medium, and the frictional resistance can be reduced.

In recent years, however, there has been an increasing demand for higher-density magnetic recording and reproduction apparatuses, such as magnetic disk devices used in computers. In response to such a demand, it is necessary to reduce the magnetic spacing between the magnetic head and the magnetic disk, i.e., the floating height of the magnetic head, as much as possible. Recently, a glide height value that is the distance from the disk average surface is required to be 10 nm or less, and a head floating height is required to be 30 nm or less.

Japanese Laid-Open Patent Application No. 9-326115 discloses a technique of reducing the head floating height by evaluating the undulations and ripples formed by the irregularities on the surface of a magnetic recording medium.

Also, a magnetic recording medium having a non-texture process performed thereon has been suggested. The non-texture process is performed to restrict the irregularities on the surface within a predetermined range so as to reduce the head floating height. However, the non-texture process cannot solve the problem of head adhesion.

The technique disclosed in Japanese Laid-Open Patent Application No. 9-326115 involves the evaluation of the undulations and ripples in the circumferential direction (the recording and reproducing direction of the magnetic head). In this technique, the floating height of the magnetic head is restricted to 100 nm or smaller. In recent years, however, there has been a demand for magnetic heads having even smaller floating heights, such as 30 nm or less. As a result, it has become difficult to realize such a small floating height only by putting a restriction on the shapes of irregularities in the circumferential direction of the magnetic disk.

Furthermore, in the conventional magnetic disk apparatuses, a contact start stop (CSS) method in which the floating surface of the magnetic head is brought into contact with the surface of a magnetic disk and then slidably moves on the surface of the magnetic disk is widely employed. In order to reduce the floating height, it is necessary to perform the texture process and reduce the heights of the irregularities on the surface of the magnetic disk. However, if the irregularities on the surface of the magnetic disk are made too small in height, the surface of the magnetic disk is smoothed. This will result in the problems of the adhesion and high friction of the magnetic head at the time of contact start and stop.

SUMMARY OF THE INVENTION

A general object of the present invention is to provide substrates for magnetic recording media in which the above disadvantages are eliminated.

A more specific object of the present invention is to provide a substrate for a magnetic recording medium that is formed by a predetermined material so as to reduce the floating height of a magnetic head.

Another specific object of the present invention is to provide a method of evaluating a magnetic recording medium that can reduce the floating height of a magnetic head.

The above objects of the present invention are achieved by a substrate for a magnetic recording medium that comprises a sintered body provided with pores having a diameter in the range of 0.05 $\mu$m to 2.0 $\mu$m extending across 5% to 50% of the surface area of the substrate.

With this substrate for a magnetic recording medium, the surface of the substrate is provided with a large number of pores even if the surface appears to be flat. Accordingly, a magnetic recording medium formed by this substrate has only a small contact area with the magnetic head. Even if the floating height becomes small and the magnetic head is brought into contact with the surface of the magnetic recording medium, there will be no problem of adhesion and high friction with the magnetic head.

The above objects of the present invention are also achieved by a method of manufacturing a substrate for a magnetic recording medium, comprising the step of sintering a particle material containing a porous material at a temperature higher than the melting point of the porous material. The particle material may be aluminum particles. The porous material is not specifically limited, but should preferably be one material selected from the group consisting of lead, copper, magnesium, nickel, zinc, tin, manganese, silicon, glass, and resin.

By this method, when a magnetic layer and a protection layer are formed on the substrate, the floating height of the magnetic head can be reduced, thereby obtaining a magnetic recording medium having a higher recording density.

The above objects of the present invention are also achieved by a method of evaluating a magnetic recording medium, comprising the steps of:

measuring the maximum height of each of a plurality of waveforms having different wavelengths in the moving direction of a magnetic head on the surface of the magnetic recording medium; and determining the sum of the maximum heights of the plurality of waveforms.

This method further includes the steps of:

measuring the maximum height Wp of undulations having a wavelength of 2.5 mm or larger in the recording/reproducing direction of the magnetic head, the maximum height MWp of ripples having a wavelength in the range of 10 μm to 2.5 mm, and the maximum height Rp of minute ripples having a wavelength of 10 μm or smaller; and comparing a required glide height value with the sum of Wp, MWp, and Rp, wherein the maximum height RCmax of irregularities in the scanning direction of the magnetic head is 20 nm or smaller in the floating guaranteed area (or the recording area) on the magnetic head.

By the above evaluation method, the glide height value required for a magnetic recording device is determined and then compared with the sum of Wp, MWp, and Rp. In this manner, it is determined whether or not the magnetic recording medium is suitable for high-density recording with a small floating height.

It should be understood here that the moving direction of the magnetic head is the radial direction of a disk while the recording/reproduction direction of the magnetic head is the circumferential direction of the disk. The moving direction and the recording/reproduction direction of the magnetic head are perpendicular to each other.

The above and other objects and features of the present invention will become more apparent from the following description taken in conjunction with the accompanying drawings.

BRIEF DESCRIPTION OF THE DRAWINGS

FIG. 6 shows the data obtained from substrates A to E;

FIG. 7 shows the result data obtained from examples and comparative examples with respect to the substrates A, B, C, and E;

FIG. 8 shows the result data obtained from an example and a comparative example with respect to the substrate D;

FIG. 12 shows the relationship between a magnetic head and a rotational magnetic disk in a magnetic disk apparatus on which a magnetic disk produced with the substrate of the second embodiment is mounted.

DESCRIPTION OF THE PREFERRED EMBODIMENTS

The following is a description of embodiments of the present invention, with reference to the accompanying drawings.

[First Embodiment]

FIGS. 1 to 5 illustrate the principles of a first embodiment of the present invention. This first embodiment is a method of determining whether or not each magnetic recording medium is suitable for reducing the floating height.

Figure 1:
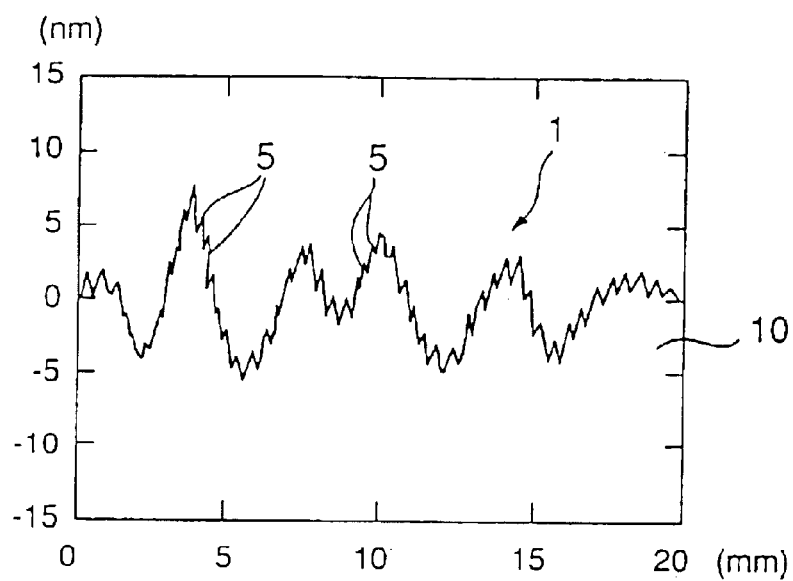
FIG. 1 is an enlarged view of the surface of a magnetic disk in its circumferential direction.

FIG. 1 illustrates the surface condition of a magnetic disk 10 in the circumferential direction. Seen from a distance, the surface of the magnetic disk 10 is flat, but has irregularities 1 in an enlarged view, as shown in FIG. 1. The irregularities 1 are made up of rough ripples 5 as indicated by the minute waveforms in FIG. 1.

Conventionally, the floating height of a magnetic head is determined from the surface irregularities 1 and the rough ripples 5 in the circumferential direction (normally the longitudinal direction of a magnetic head).

However, when the floating height of the magnetic head is 30 nm or less, it is difficult to judge from the evaluation of the surface roughness only in the circumferential direction whether or not the floating height can be reduced. In view of this, the present inventors made intensive studies on the irregularities on the entire surface of a magnetic disk, and have found conditions of a magnetic disk that can achieve a floating height of 30 nm or less.

Figure 2:
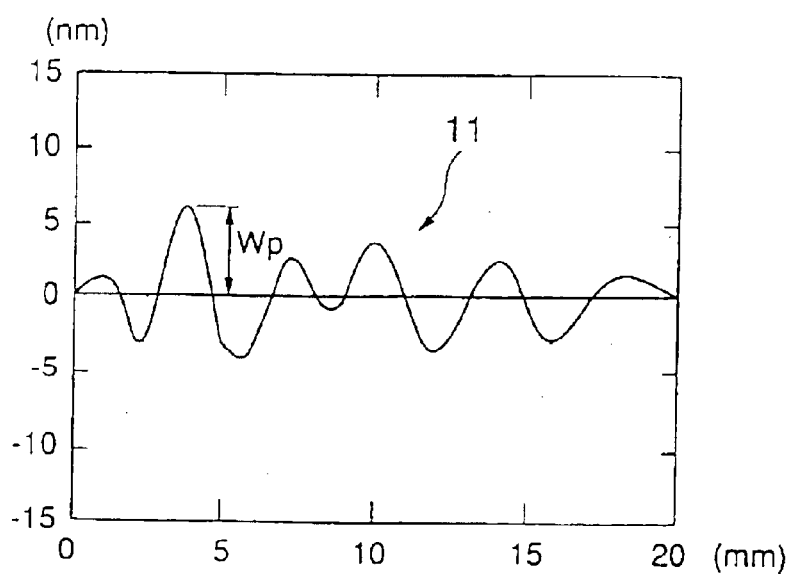
FIG. 2 shows extracted undulations from the irregularities shown in FIG. 1.

FIG. 2 is an enlarged view of undulations 11 extracted from the surface irregularities 1 shown in FIG. 1. In FIGS. 1 to 4, the zero position on the ordinate axis indicates the center line, which is the average position determined from the amplitude of each waveform. In this first embodiment, the maximum height of the undulations 11 from the center line is indicated by Wp, as shown in FIG. 2. Here, the undulations 11 are a waveform having a wavelength of 2.5 mm or larger.

Figure 3:
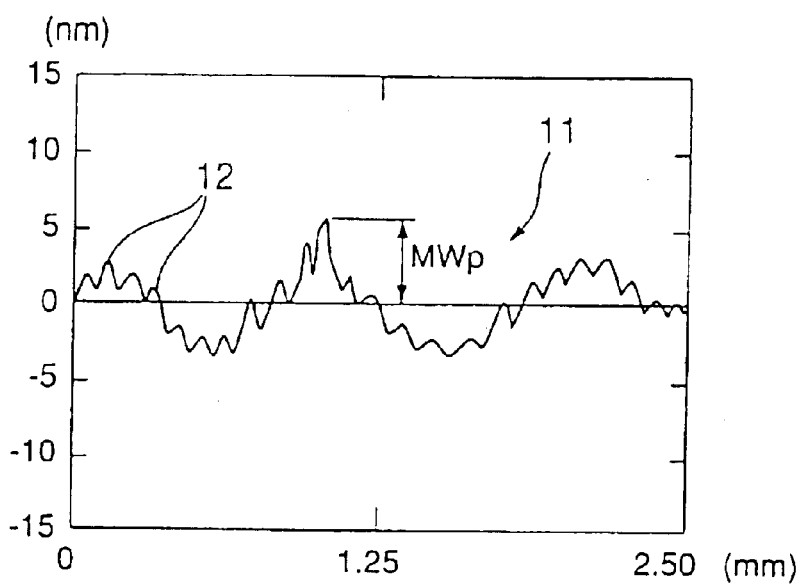
FIG. 3 is an enlarged view of a part of the undulations shown in FIG. 2.

FIG. 3 is an enlarged view of a part of the undulations 11 shown in FIG. 2. The waveform of the undulations 11 shown in FIG. 2 contains ripples 12 that have the maximum height MWp. In this embodiment, the ripples 12 are a waveform having a wavelength of 10 μm to 2.5 mm.

Figure 4:
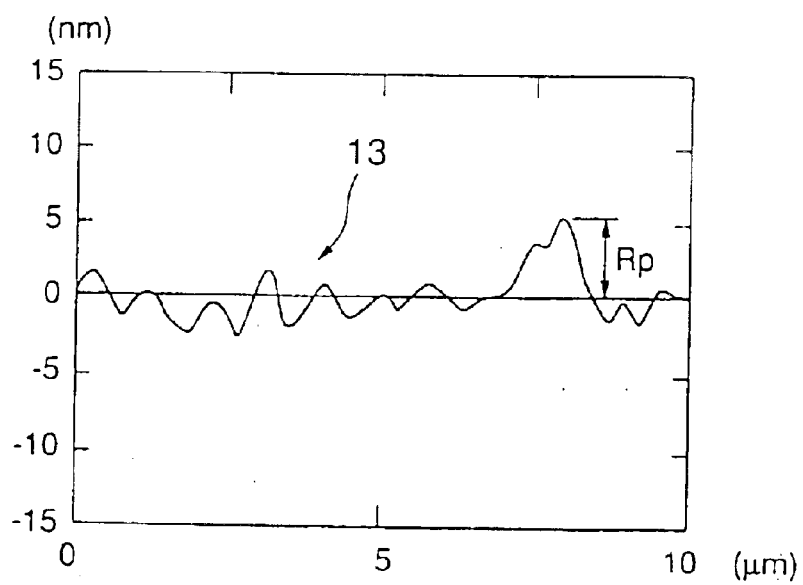
FIG. 4 is an enlarged view of a part of the ripples shown in FIG. 3.

FIG. 4 is an enlarged view of a part of the ripples 12 shown in FIG. 3. When seeing the undulations 11 and the ripples 12 more closely, there are minute ripples 13 having a waveform of 10 μm or less. The minute ripples 13 are generally referred to as surface roughness. In this embodiment, the maximum height of the roughness is indicated by Rp.

As described above, in this embodiment, the surface irregularities are evaluated based on the three waveform elements, i.e., the undulations, ripples, and roughness, in the circumferential direction.

In this embodiment, the undulations in the radial direction of a magnetic disk are also taken into consideration. More specifically, the undulations in the radial direction are evaluated as to whether or not the maximum height RCmax of the undulations is smaller than a predetermined value.

Figure 5:
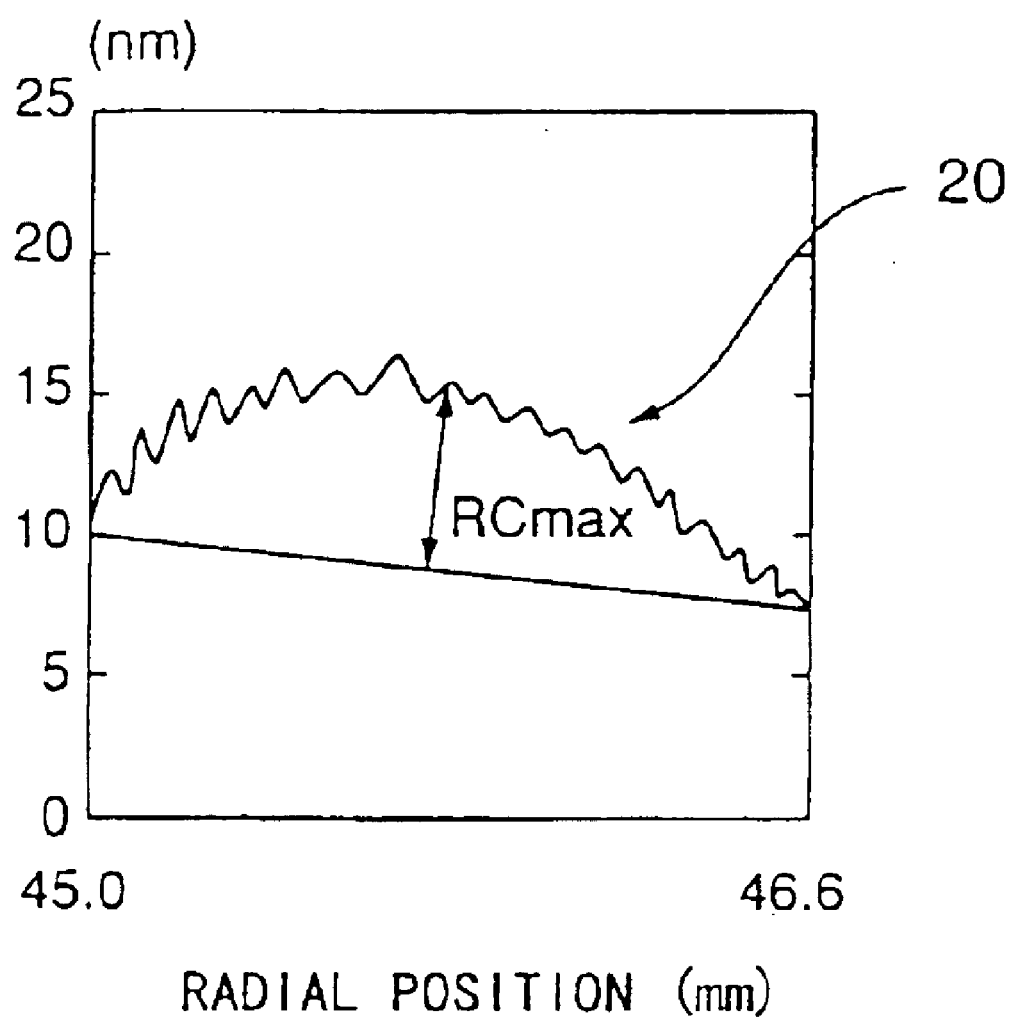
FIG. 5 is an enlarged view of the surface of the magnetic disk in its radial direction.

FIG. 5 shows an enlarged view of the surface condition of a magnetic disk in its radial direction. Due to the chamfering process, a ring-shaped protrusion 20 is formed on the outer periphery of the magnetic disk. Accordingly, the maximum height of the protrusion 20 is equivalent to the maximum height RCmax.

The enlarged view in FIG. 5 shows an end portion that is located at a distance of 45.0 mm to 46.6 mm in the radial direction of the magnetic disk, which has a diameter of approximately 95 mm.

A floating guaranteed area (or the recording area) on a magnetic disk is an area in which the floating of a magnetic head is guaranteed. The magnetic disk concentrically includes a clamp region to be fixed to a rotational drive axis (spindle), a CSS region, a data region, and the peripheral region, in that order starting from the center. The floating guaranteed area of this embodiment is an area that includes the CSS region, the data region, and a part of the peripheral region.

If the wavelength of the undulations in the radial direction of the substrate of a magnetic disk is larger than the length corresponding to the external shape of the magnetic head in the width direction, a floating loss of the magnetic head is caused. Within the floating guaranteed area, the maximum height RCmax should be 20 nm or less, and more preferably, should be 10 nm or less. With such small surface irregularities, the floating loss of the magnetic head can be reduced.

The wavelength of the undulations in the circumferential direction of the substrate of the magnetic disk also has an influence on the floating loss of the magnetic head. The wavelength of the undulations in the longitudinal direction of the magnetic head is preferably three times as large as the length corresponding to the external shape of the magnetic head in the longitudinal direction. Furthermore, the wavelength should preferably be in the range of several tens of nanometers to several millimeters. If the external shape of the magnetic head in the longitudinal direction is 2 mm, for instance, the wavelength is approximately 6 mm.

The wavelength range is divided into three waveform elements, which are the undulations, ripples, and minute ripples. A waveform having a wavelength of 2.5 mm or larger that may be approximately three times as large as the length of the magnetic head in the longitudinal direction represents undulations. The maximum height of this wavelength is indicated by Wp. A waveform having a wavelength in a range of 10 $\mu$m to 2.5 mm represents ripples. The maximum height of the waveform is indicated by MWp. A waveform having a wavelength in a range of 50 nm to 10 $\mu$m represents minute ripples. The maximum height of the minute ripples is indicated by Rp.

Since the simple sum of those maximum heights, which is Wp+MWp+Rp, is equivalent to a required glide height value of the magnetic disk, the simple sum of the maximum heights is compared with the required glide height value. More specifically, from the expression, Wp+MSp+Rp≦required glide height, it is determined whether or not the magnetic recording medium has the required glide height value.

If the magnetic recording medium is the CSS type, the minute ripples should preferably have an average roughness Ra of 0.2 nm or larger, because it is necessary to prevent adhesion and to reduce the friction.

To produce a magnetic recording medium that satisfies the smaller floating height conditions through the above-described evaluation method, the polishing pad, the polishing agent, and the processing time need to be adjusted as necessary. By doing so, RCmax can be restricted to 20 nm or less in the radial direction of the magnetic disk, and WP, MSp, and Rp determined from the above expression are realized in the circumferential direction. The surface roughness can be controlled by the texture process performed on the substrate prepared for manufacturing the magnetic recording medium.

Next, the manufacturing of the above-described magnetic disk determined to be suitable for reducing the floating height will be described. As for the material for forming the substrate for the magnetic recording medium, materials that have conventionally been used for substrates can be used. Such materials include non-magnetic materials, such as aluminum alloys, glass materials including tempered glass and crystallized glass, resin, and composite materials.

In this embodiment, the substrate is made of aluminum. A rolled plate made of an aluminum alloy is first stamped out into a disk-like plate having a diameter of 3.5 inches, thereby obtaining a substrate disk. The substrate disk is then subjected to pressure annealing, and a cutting process is performed on the inner and outer diameters by an NC lathe, thereby adjusting the size. Further, both surfaces of the substrate disk are ground with a grindstone having a roughness of No. 2000 to No. 6000, so that both the maximum height Wp of the undulations and the maximum height MWp of the ripples have desired values. Both surfaces of the substrate disk are then provided with a Ni—P plating layer having a thickness in a range of 5 $\mu$m to 10 $\mu$m.

Next, a polishing process is performed to polish both surfaces of the Ni—P plating layer. This polishing process is carried out using a 2-side polishing machine. As for the polishing solution to be used here, a solution containing oxidizing ions or a solution mainly containing aluminum oxide or silica can be employed. For those solutions, a polishing agent containing alumina can increase the polishing speed and reduce most effectively the maximum height Wp of the undulations and the maximum height MWp of the ripples. Especially, a polishing agent containing hexagonal plate-like alumina or calcined alumina is most preferable. The hardness of the polishing pad should preferably be in the range of 60 to 100 in accordance with the JIS A (JIS K-6301) standards. If the polishing pad has a hardness smaller than the above range, the outer periphery of the substrate will be too easily polished. As a result, the wavelength of the undulations in the radial direction of the substrate becomes larger than the length corresponding to the external shape of the magnetic head in its width direction. The size of the polishing agent and the polishing time divided into a few stages are suitably selected, so that a substrate having the maximum heights Wp, MWp, and Rp can be produced.

In the above manufacturing experiment, substrates A to E were obtained. FIG. 6 shows the data of the substrates A to E.

A texture process described below was performed on the substrates A to E, and a Cr surface treatment film, a CrCoPt magnetic layer, and a carbon-based protection film were formed on the surface of each substrate in that order. After that, a fluorine-based lubricant was applied onto the protection film, thereby completing a magnetic disk.

The texture process was carried out by pressing processing tape to a rotating substrate while dripping a polishing liquid onto the rotating substrate. The polishing liquid contained polycrystal diamond, and two types were employed in the texture process. One of the two types of the polycrystal diamond had a primary average grain size of 0.15 $\mu$m, while the other had a primary average grain size of 0.30 $\mu$m. As for the other processing conditions, the tape feeding speed was 30 mm/min, the roll pressure was 1 kg, the substrate rotation speed was 450 rpm, the oscillation amplitude was 3 mm, the frequency was 7 Hz, and the processing time was 25 seconds.

For the substrates A and B, the texture process was performed under the two conditions that the primary average grain sizes of the polishing liquid were 0.15 $\mu$m and 0.30 $\mu$m. For the substrates C and E, the texture process was performed, with the primary average grain size being 0.30 $\mu$m. For the substrate D, the texture process was performed, with the primary average grain size being 0.15 $\mu$m. At the same time, an experiment was conducted by performing no texture process on the substrate D for a comparison purpose.

A magnetic recording medium was formed under the above texture processing conditions. The glide height value, the maximum heights Wp, MWp, Rp, and RCmax, the average roughness Ra, and the frictional characteristics were measured.

The maximum heights Wp and MWp in the circumferential direction of the magnetic recording medium, and the maximum height RCmax of the undulations in the radial direction were measured using an optical interferometer. In the measurement of MWp and RCmax, in which the measurement range was narrow, the field of view was 2.5 mm×1.8 mm. The measurement range of RCmax was 45.0 mm to 46.6 mm in the radial direction.

The roughness Ra was measured by an AFM, and the measurement range was 10 $\mu$m×10 $\mu$m.

The measurement of the glide height value was carried out using a magnetic head having a length of 2.0 mm in the longitudinal direction (i.e., the circumferential direction of the magnetic recording medium). The floating characteristics of the magnetic head had been already checked in advance. A contact between the magnetic disk and the magnetic head was then detected by a piezosensor. Based on the rotation speed of the magnetic disk at the time of the contact, the glide height value was determined as the highest point on the magnetic disk. The measurement location of the glide height was at the center of the magnetic head, at a radial location R of 30.0 mm from the center of the magnetic disk, and at a radial location R of 45.8 mm from the periphery of the magnetic disk.

FIG. 7 shows the results of experiments and comparative experiments conducted on the substrates A, B, C, and E. When the sum of Wp+MWp+Rp was 10 nm or smaller (in Examples 1-1 to 1-4), the glide height at the center of the magnetic head and the radial location R of 30.00 mm was 10 nm or smaller, as shown in FIG. 7.

When the maximum height RCmax was 20 nm or larger, the glide height value exceeded 10 nm at the radial location R of 45.8 mm on the peripheral side, even if the sum of Wp+MWp+Rp was 10 nm or smaller and the glide height at the radial location R of 30 mm was 10 nm or smaller. As a result, the surface shapes could not satisfy the conditions (Comparative Example 1-1).

FIG. 8 shows the data obtained from the substrate D. In Comparative Example 2, the sum of Wp+MWp+Rp was 10 nm or smaller, and the glide height was 10 nm or smaller. However, no texture process was performed, which resulted in insufficient surface roughness. As a result, the initial frictional coefficient was 5 or larger. With such a high initial frictional coefficient, there will be great possibilities of adhesion of the magnetic head and excessive frictional resistance, when used in a CSS-type magnetic recording apparatus.

In Example 2, on the other hand, the average roughness Ra of the substrate after the texture process was 0.20 nm or larger, so that the initial friction coefficient was 2.0, which is much lower than 5. With such a low initial friction coefficient, there will be no such problems as adhesion of the magnetic head and frictional resistance.

By the above method of evaluating magnetic recording media, it becomes possible to detect magnetic recording media that can ensure small floating heights.

[Second Embodiment]

A second embodiment of the present invention involves the material of the substrate, which is formed so as to ensure a small floating height of the magnetic head. More specifically, when a substrate for a magnetic disk is formed, a large number of pores are formed on the surface of the substrate so as to reduce the contact area with a magnetic head. Such a substrate for a magnetic recording medium can ensure a small floating height of the magnetic head.

The substrate for a magnetic recording medium of this embodiment is formed as a sintered body that is provided with pores having a diameter of 0.05 $\mu$m to 2.0 $\mu$m extending across 5% to 50% of the surface area. A magnetic recording medium manufactured from this substrate has only a small contact area, even when the floating height of the magnetic head is reduced. Accordingly, there will be no trouble caused by adhesion of the magnetic head or a high frictional resistance.

Figure 9A:
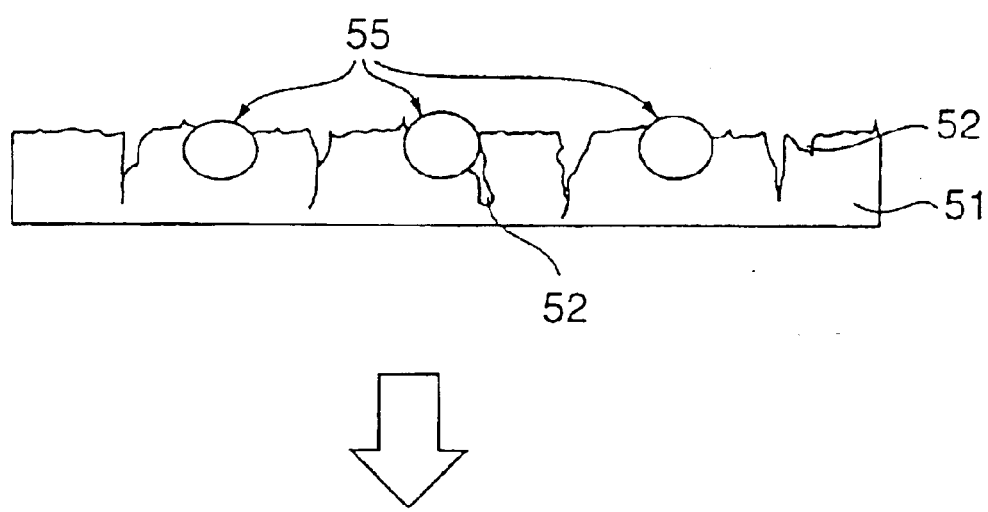
FIGS. 9A and 9B show the process in which a large number of pores are formed on a magnetic recording medium substrate produced in accordance with a second embodiment of the present invention.
Figure 9B:
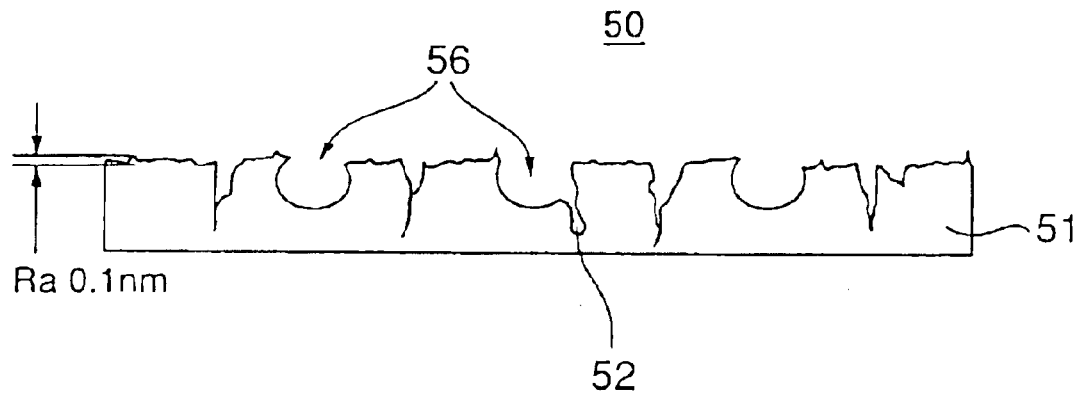

In the following, the second embodiment will be described in greater detail, with reference to FIGS. 9A and 9B through 12. FIGS. 9A and 9B show the step of forming a large number of pores on a magnetic recording medium substrate 50.

Conventionally, an aluminum material or a glass material having a metallic material formed on the surface has been generally used as the material for a substrate for a magnetic recording medium. In this embodiment, however, a particle material that can be sintered is used. Examples of such a particle material includes aluminum particles. For instance, a base member is formed by mixing the aluminum particles with lead stearate as a lubricant for preventing burning. A material for forcibly forming pores (this material will be hereinafter referred to as the "porous material") is then applied to the base member.

The porous material is not strictly defined, but can be any material, as long as it has a large number of pores on the surface after the aluminum particles are sintered to form the substrate (in a disk-like form). The pores are formed as a result of melting, evaporating, or sublimating at a temperature lower than the sintering temperature. The porous material can be selected from the group consisting of lead, copper, magnesium, nickel, zinc, tin, manganese, silicon, glass, and resin such as vinyl chloride.

In a case where lead is used as the porous material, lead particles having a diameter of 0.1 $\mu$m to 2.0 $\mu$m are blended on the base member at a proportion of 5% to 50% with respect to the surface area of the substrate, thereby obtaining a substrate material prior to the sintering.

In the step of FIG. 9A, after the aluminum particles 51 are compressed into a predetermined shape by a pressing device, lead particles 55 are scattered on the compressed aluminum particles 51.

The step of FIG. 9B shows the substrate 50 after aluminum sintering at a temperature slightly lower than 600° C. The melting point of lead is approximately 330° C. Therefore, the lead particles 55 melt at the temperature of almost 600° C., and flow into pores 52 formed in the sintered aluminum particles 51. As a result, new pores 56 appear at locations where the lead particles 55 existed prior to the melting.

The second embodiment involves the porous characteristics of a compressed molding material. The diameter and density of the pores vary with the size of particles used for sintering and the sintering temperature. The sintered body obtained by sintering the aluminum particles 51 is a porous material having a large number of pores. The melted lead flows into the pores so that the new pores 56 are formed at the location where the lead particles 55 used to exist. The pores 52 formed in the compressed aluminum particles 51 reduce the contact area. However, to control the diameter and the density of the pores, the new pores 56 are forcibly formed by adding the porous material.

In this embodiment, the lead particles 55 melt at a sintering temperature, and then are absorbed into the compressed aluminum particles 51, thereby forming the new pores 56. However, the formation of new pores is not limited to this, as long as the porous material vanishes from its original locations after a sintering process. Accordingly, it is also possible to form new pores by evaporating or sublimating the porous material by the aluminum sintering process. The state of the pores formed on the surface of the sintered body can be controlled by changing the size and the amount of the porous material.

The magnetic recording medium substrate formed in the above-described manner can be used as it is. However, in order to improve the performance of the sintered body, it is possible to perform re-compressing of the substrate and re-sintering of the re-compressed substrate.

Furthermore, a polishing process may be performed so as to increase the smoothness of the surface of the substrate. By the polishing process, the surface of the substrate may be in a non-texture state, having an average roughness Ra of only 0.1 nm. Considering the fact that the average roughness Ra of a conventional magnetic recording medium is in the range of 0.4 nm to 0.6 nm, and that the maximum roughness of such a conventional magnetic recording medium is in the range of 6 nm to 7 nm, the average roughness Ra of 0.1 nm represents an extremely smooth surface.

The substrate of this embodiment, however, has a large number of pores 56 on its surface. Accordingly, there will be no problems such as adhesion of a magnetic head, and the glide height of a magnetic head can be restricted to a small value. Thus, a magnetic recording medium formed from the substrate of this embodiment can ensure a small floating height of a magnetic head.

Figure 10A:
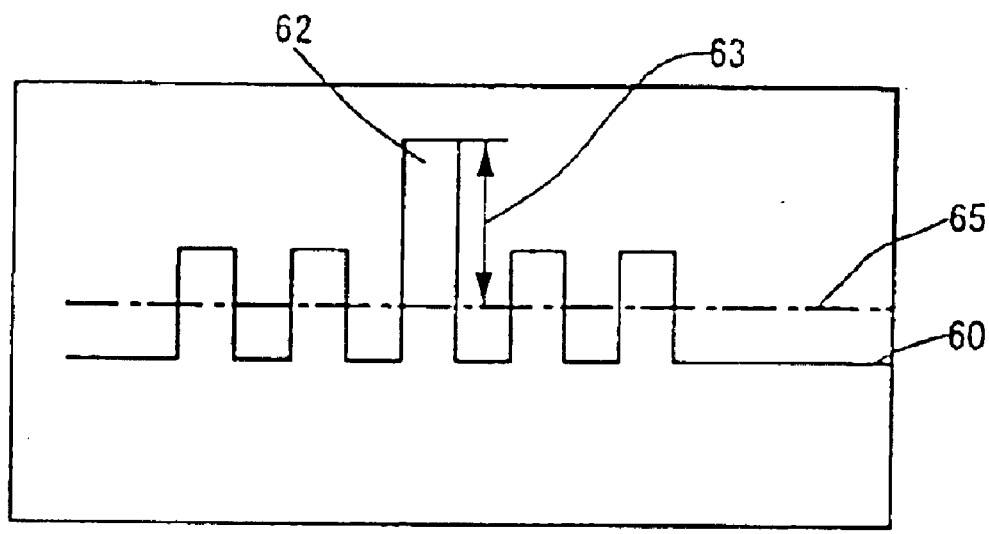
FIG. 10A is a schematic view of the surface of a conventional substrate having bump protrusions.
Figure 10B:
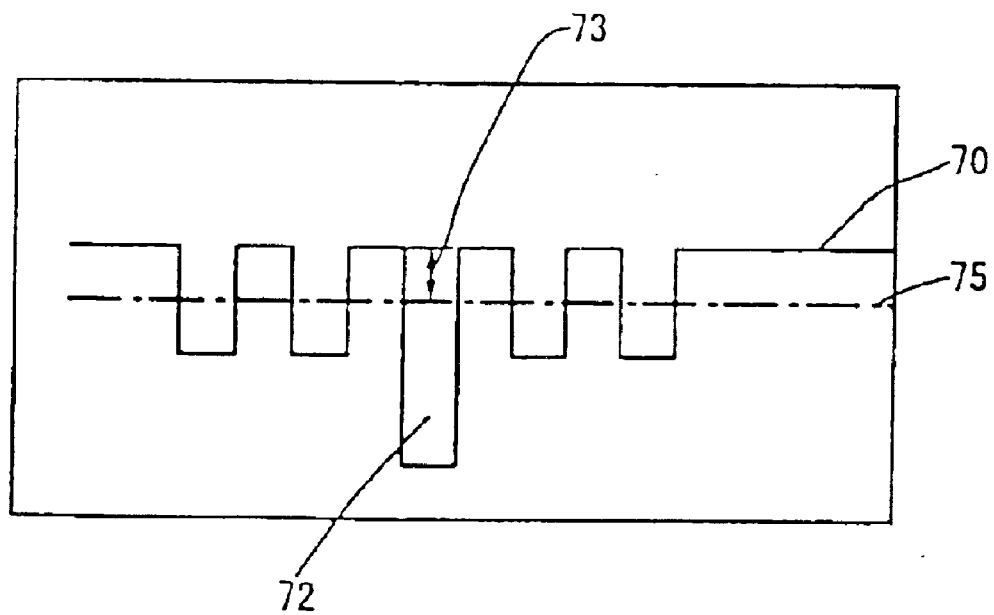
FIG. 10B is a schematic view of the surface of the substrate produced in accordance with the second embodiment of the present invention.

FIGS. 10A and 10B illustrate the features of the magnetic recording medium substrate formed in accordance with the second embodiment of the present invention. FIG. 10A schematically shows the surface of a conventional substrate having bumps. FIG. 10B schematically shows the surface of the substrate formed in accordance with the second embodiment of the present invention.

As shown in FIG. 10A, a plurality of rectangular wave protrusions corresponding to the roughness stand from the flat face 60 of the surface of the substrate, but the heights of the rectangular wave protrusions are not uniform. Especially, the height of the region of a pump 62 represents the maximum height 63. A glide height value is substantially determined by the maximum height 63. Such bump protrusions are employed to prevent the adhesion of a magnetic head. Because of this, it is difficult to restrict the glide height value to a small value, as already mentioned.

It should be understood here that a dot and dash line 65 shown in FIG. 10A represents the center line as the average roughness.

Meanwhile, in the case of the substrate of the second embodiment shown in FIG. 10B, the highest ends of the surface of the substrate constitute a flat face 70. There still remain a plurality of rectangular wave protrusions corresponding to the roughness. However, those rectangular wave protrusions are located below the flat face 70 and do not restrict the floating height of a magnetic head. In this case, a glide height may be indicated by the distance 73 between the center line 75 and the flat face 70.

Figure 11:
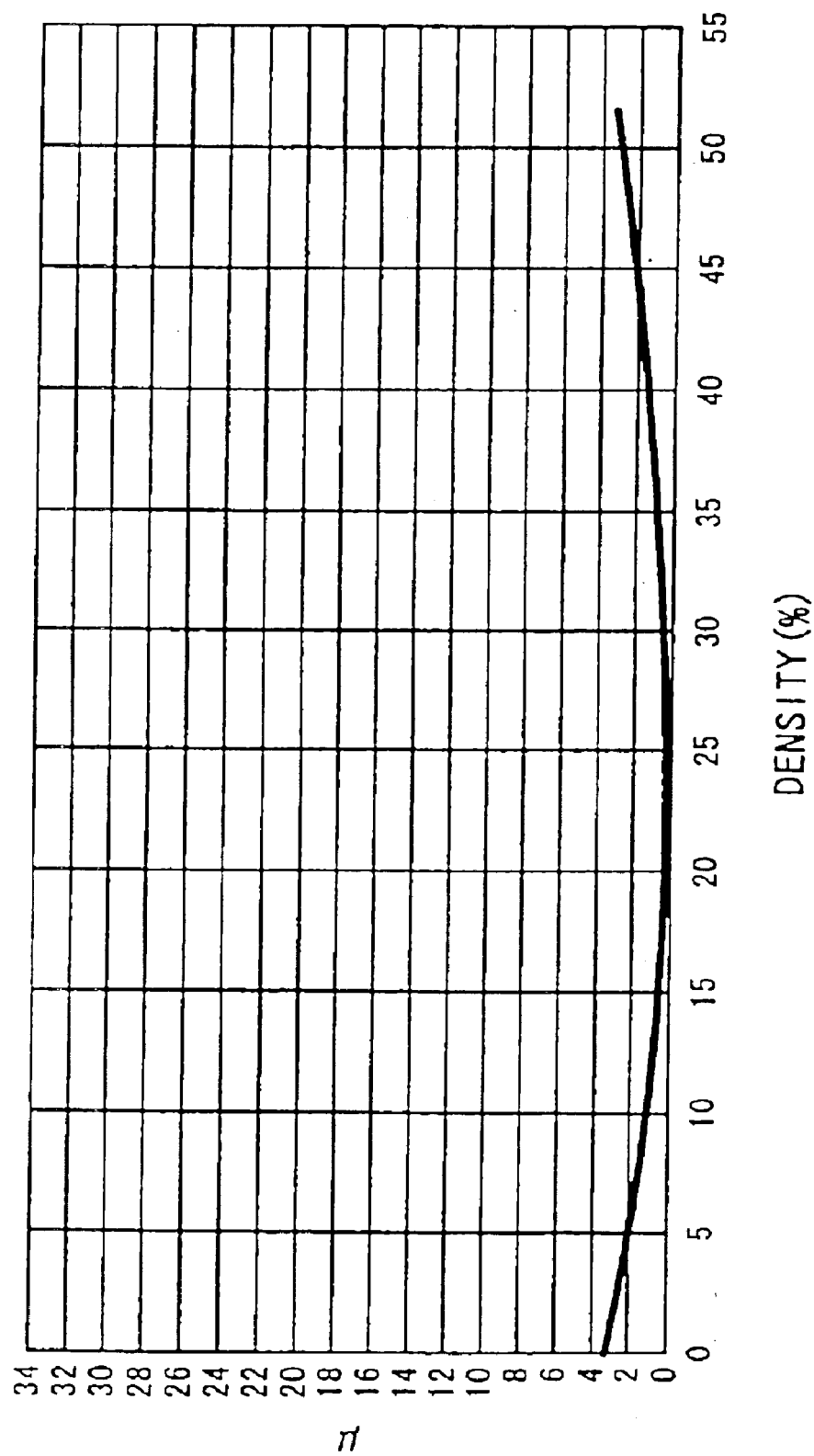
FIG. 11 shows the relationship between the density of pores and the frictional resistance in a magnetic recording medium produced using the substrate of the second embodiment.

FIG. 11 illustrates the relationship between the density of the pores and the frictional resistance in a magnetic recording medium formed with the substrate of this embodiment. As is apparent from this figure, the frictional resistance can be lowered by forming the pores across 5% to 50% of the surface of the substrate, preferably, 10% to 40% of the surface of the substrate, or, more preferably 20% to 30% of the surface of the substrate. To measure the density of such pores, the number of pores in a region of 100 $\mu$m×100 $\mu$m determined with an optical microscope, for instance, should be counted.

The porous region may occupy the entire surface of the substrate. In a case of a CSS-type magnetic recording medium, it is also possible to sinter a substrate in such a manner as to form the pores in the CSS region. In other words, a predetermined amount of porous material may be blended in the CSS region prior to the sintering process.

For the substrate of this embodiment, a magnetic layer and a protective layer are formed on the substrate using a sputtering apparatus, for instance, thereby obtaining a magnetic recording medium such as a magnetic disk. In such a case, a Ni—P plating process or a texture process can be performed on the substrate, if necessary, prior to the formation of the magnetic layer.

The following is a description of a case where a magnetic disk formed from the substrate of the second embodiment of the present invention is mounted on a magnetic recording/reproducing apparatus.

FIG. 12 shows the relationship between a magnetic head 120 and a rotating magnetic disk 110 in a magnetic disk apparatus 100. The magnetic disk 110 is formed by laminating an underlayer 113 and a magnetic film 115 on a substrate 111 formed in accordance with the second embodiment of the present invention. A protection film 117 containing amorphous carbon is formed on the magnetic film 115, and a fluorine-based lubricant film 119 is further formed on the protection film 117. The detailed view of the surface of the substrate 111 is not shown in FIG. 12.

A CSS region in which the magnetic head 120 is brought into contact with and slidably moves on the surface of the magnetic disk 110 at the time of rotation start or stop of the magnetic disk 110 is formed in the magnetic disk apparatus 100.

The magnetic disk apparatus 100 can ensure a smaller glide height and a smaller floating height for the magnetic recording medium 120, compared with the prior art. Furthermore, there will be no problems such as adhesion of the magnetic head 120 in the CSS region.

The present invention is not limited to the specifically disclosed embodiments, but variations and modifications may be made without departing from the scope of the present invention.

The present application is based on Japanese priority application No. 2000-159101, filed on May 29, 2000, the entire contents of which are hereby incorporated by reference.

What is claimed is:

1. A substrate for a magnetic recording medium, comprising a sintered body of aluminum particles provided with pores having a diameter in a range of 0.05 $\mu$m to 2.0 $\mu$m extending across 5% to 50% of a surface area thereof.

2. The substrate of claim 1 comprising aluminum particles with lead stearate.

3. The substrate of claim 1 comprising pore-forming material selected from the group consisting of lead, copper, magnesium, nickel, zinc, tin, manganese, silicon, glass and resin.

4. The substrate of claim 3, wherein said pore-forming material comprises lead particles having a diameter of about 0.1 $\mu$m to about 2.0 $\mu$m, blended at a proportion of 5% to 50% with respect to the surface area of the substrate.

5. The substrate of claim 1 having average roughness Ra of about 0.1 nm.

* * * * *